Figure 1:
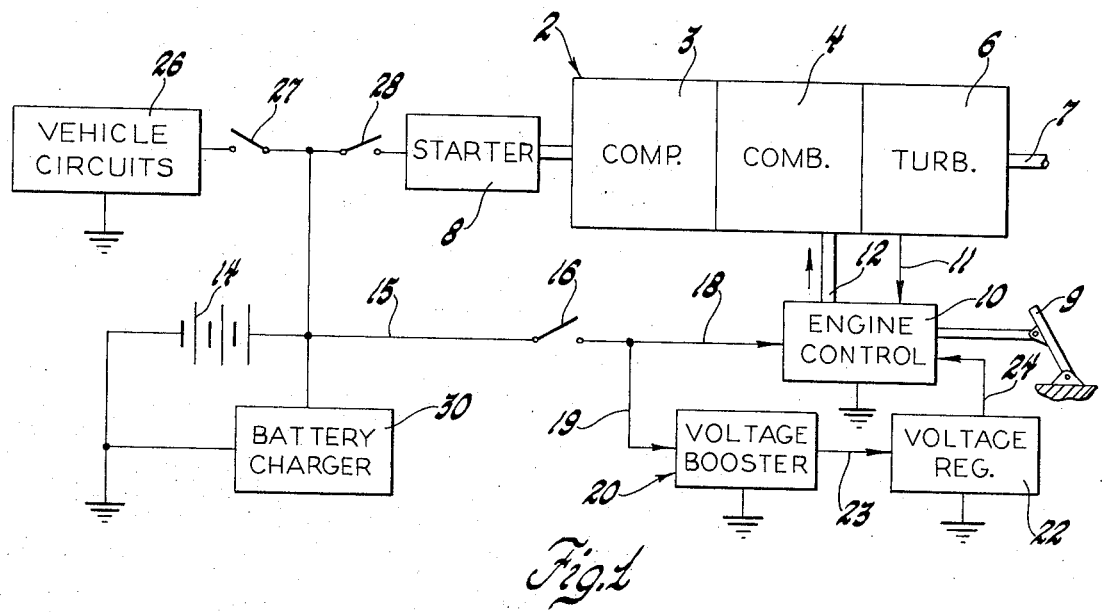

United States Patent [19]

Davis et al.

[11] 3,869,660
[45] Mar. 4, 1975

[54] VOLTAGE BOOSTER

[75] Inventors: James L. Davis, Kokomo; Leslie Joseph Pechous, Carmel, both of Ind.

[73] Assignee: General Motors Corporation, Detroit, Mich.

[22] Filed: Oct. 26, 1973

[21] Appl. No.: 410,017

[52] U.S. Cl............ 323/17, 323/DIG. 1, 331/113 R
[51] Int. Cl. .............................................. G05f 1/64
[58] Field of Search ............. 321/2, 18, 19; 323/17, 323/18, DIG. 1; 307/97, 297; 331/113 R

[56] References Cited
UNITED STATES PATENTS

| | | | |
|---|---|---|---|
| 3,506,910 | 4/1970 | Bevis | 323/DIG. 1 |
| 3,571,697 | 3/1971 | Phillips | 323/DIG. 1 |
| 3,590,361 | 6/1971 | Bishop | 323/DIG. 1 |
| 3,803,517 | 4/1974 | Bellocchio | 321/2 |

Primary Examiner—William H. Beha, Jr.
Attorney, Agent, or Firm—Paul Fitzpatrick

[57] ABSTRACT

A device for providing a substantially constant D.C. potential output from a D.C. input which varies from higher than to lower than the output. The input line is connected through an inductive reactor and a rectifying diode to a storage capacitor. An intermittently conducting switching transistor closes a circuit from the input directly through the reactor. The switching transistor is controlled by two transistors connected in an oscillator circuit. The frequency and duty cycle of conduction through the switching transistor is controlled by the oscillator. The oscillator in turn is controlled by a mixing circuit which has inputs of both the source and storage capacitor potentials. The storage capacitor supplies a voltage regulator which may be conventional.

4 Claims, 2 Drawing Figures

VOLTAGE BOOSTER

Our invention is directed to provision of a simple and effective device for providing a regulated D.C. potential from a D.C. source which has wide swings of potential from above to below that desired in the output. Specifically, our invention is embodied in a voltage booster of variable gain to supply D.C. at above the desired regulated output voltage to a voltage regulator of any suitable type. Our circuit is intended for use in an engine control system in a motor vehicle in which the source of power for the control system is the combination of the generator or alternator and the storage battery of the vehicle. In the specific embodiment described, the purpose of our device is to provide an approximately constant D.C. output at about 12 volts or more to supply an accurate voltage regulating circuit which provides an accurate 10 volt D.C. output for stabilization of the engine controls.

There are numerous voltage regulator circuits for providing constant D.C. outputs from varying inputs but, for most accurate performance, these generally need a reasonably constant source of D.C. power. Also, such systems, if they are to provide an output potential higher than the input and accurately regulated, are of considerable complexity.

In typical motor vehicles the nominal storage battery voltage may be, for example, 12 volts but, in such cases, depending upon operation of various current-consuming devices, particularly an engine starter, and depending upon the effect of the battery charging device or alternator, the actual available potential may vary over a range of something like 3 to 16 volts D.C. Also, it is subject to abrupt changes.

For control systems for automotive engines in which accurate control is required, it is unfeasible to use this unregulated battery or vehicle power system D.C. because of the wide fluctuations of the potential, and particularly because it can drop to a value below that desired for use in the control system. With this in mind, we have devised a simple, compact, and reliable voltage supplying and controlling device which we term a voltage booster. In the specific embodiment to be described, our booster is capable of providing a 12 to 16 volt D.C. output from a D.C. input which ranges between 3 and 16 volts with changes in conditions of operation in a vehicle and its power plant.

Outlining briefly the nature of the preferred embodiment of our invention, it is of the type in which the current source is connected through an inductive reactance (a choke coil) and a switch so that, upon closing the switch, there is a build-up of current and magnetic flux in the coil. The junction of the coil and switch are connected through a rectifier to a storage capacitor so that, when the switch is opened, the decay of the magnetic flux causes a surge of emf and supply of current through the rectifier to the storage capacitor. Upon decay of the magnetic flux, the switch is again closed, so that upon repetition of the cycle an intermittent charging current is supplied to the storage capacitor which delivers the output potential and current to the device which is to be supplied. The rectifier prevents return flow from the storage capacitor into the circuit. The switch is a transistor capable of handling substantial power and this transistor is switched on and off by an oscillator circuit of a multivibrator type including two transistors.

According to our invention, the frequency of oscillation and the duty cycle (the portion of the cycle during which the switch is closed to build up energy in the inductor) are controlled in accordance with the voltage booster input and output potentials.

This control is such that the output potential is maintained substantially at a suitable level notwithstanding wide swings of the input emf or output current demand.

The principal objects of our invention are to provide a simple, reliable, and economical electronic system for providing an approximately constant D.C. energizing current from a D.C. source of widely varying potential. A further object of the invention is to facilitate the supply of accurately controlled D.C. voltage for use in control systems in automotive vehicles and other installations where there is no substantially constant potential D.C. source. A further object is to provide a voltage booster of automatically variable emf gain.

The nature of our invention and its advantages will be more fully apparent from the succeeding detailed description of the preferred embodiment of the invention.

Referring to the drawings, FIG. 1 is a schematic diagram of a vehicle gas turbine installation and controls therefor including our voltage booster.

Figure 2:
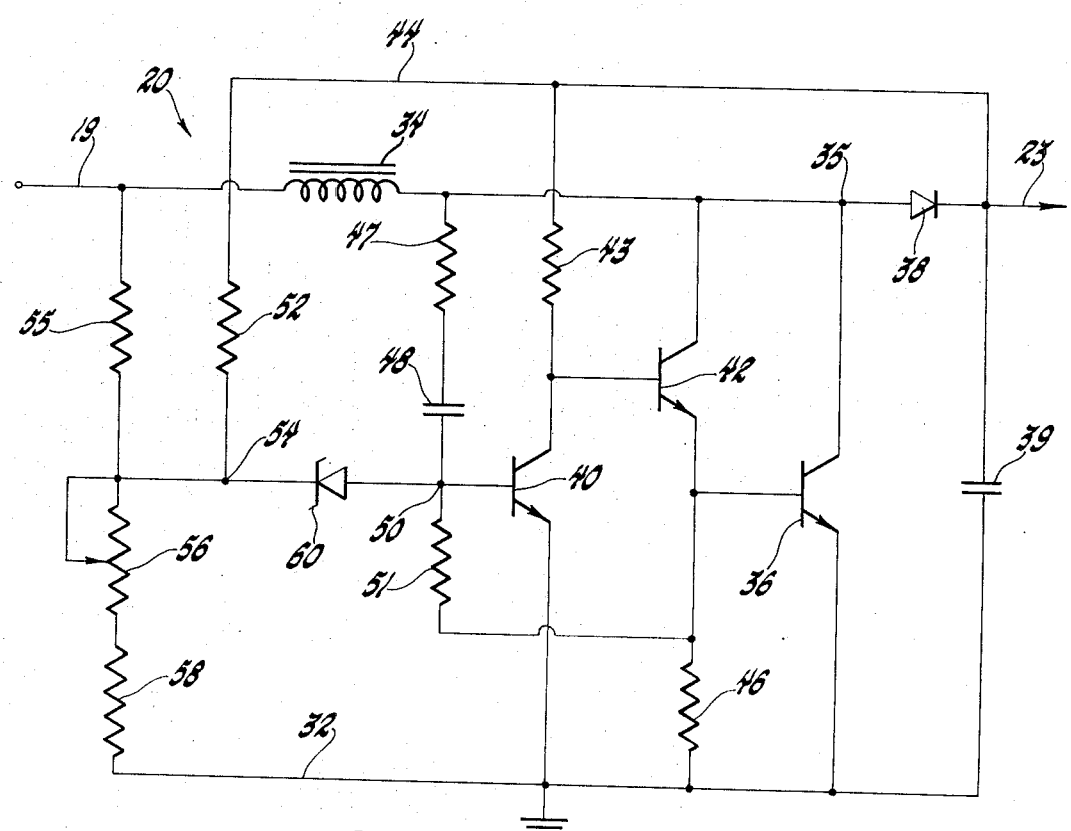

FIG. 2 is a wiring diagram of the voltage booster.

FIG. 1 may be considered to represent, so far as is appropriate to explain our invention, the power installation of a gas turbine powered vehicle.

The vehicle (not illustrated) is driven by a gas turbine engine 2 which may comprise the usual elements of a compressor 3, combustion apparatus 4, and a turbine or turbines 6. The turbine installation drives the compressor and also a power output shaft 7 which may be connected to drive the vehicle or other load through any suitable transmission. The engine is started by an electric starter 8 suitably connected to the compressor and turbine of the engine. The power output of the engine is regulated and its safe operation is monitored by a suitable engine control 10 which receives an input of desired engine output from a control such as a foot pedal 9 manipulated by the operator of the vehicle and which receives inputs of engine operating conditions, as indicated schematically by the arrow 11. The engine control acts primarily by regulating the flow of fuel to the combustion apparatus 4 through a conduit 12. The fuel may be supplied by suitable pumping means (not illustrated).

It is a modern trend to use electrical equipment so far as feasible in such engine controls. For precise control of engine operation, these controls may require a supply of direct current at an accurately regulated potential. This may be in addition to a D.C. power supply which does not require precise regulation.

As indicated in FIG. 1, the electrical circuits of the engine control are supplied from the vehicle storage battery 14 through a line or bus 15. A switch 16 energizes an uncontrolled D.C. line 18 leading to the engine control and a line 19 supplying a voltage booster 20 which is the subject of our invention. The voltage booster in turn energizes a voltage regulator 22 which supplies accurately controlled D.C. voltage to the engine control 10. The voltage booster is connected to the regulator through a line 23 and the regulator to the control through a line 24.

The storage battery 14, in addition to energizing the control, also energizes from bus 15 through switches such as 27 multifarious vehicle circuits 26 which may specifically include those for lighting, fan operation, ignition, and so on. Also, the engine starter 8, which may require much current, is energized from bus 15 through a switch 28. As is usual in vehicle installations, some sort of battery charger 30 is provided. Such a charger may be a generator or an alternator and rectifier, with suitable regulating devices. Depending upon the condition of the battery, speed of operation of the engine (driving the charger) and operation of various vehicle circuits including the starter, the potential available on bus 15 in a typical vehicle installation may vary over a range of about 5 to 1. For example, with a 12 volt nominal battery voltage, the potential may vary from about 3 volts to about 16 volts. In the specific example, where the regulated potential on line 24 is 10 volts, this is not a suitable source for energization of the voltage regulator 22, and therefore the voltage booster 20 is provided.

For the preferred voltage booster circuit, refer to FIG. 2. In connection with the description of this wiring diagram, to facilitate practice of the invention and illustrate the best mode contemplated by us of practicing the invention, the values or identification of various components as presently preferred are set out in the specification. It is to be understood, however, that these values are those selected to meet a particular installation, and may be varied to suit conditions or to profit by developments in the electronic art.

The voltage booster 20 includes a grounded datum line 32 which forms one side of the input and of the output. The positive input line 19 and the positive output line 23 likewise are illustrated. Line 19 is connected to one terminal of a reactive inductance or choke 34, the other terminal of which is connected through a first junction 35 and the collector-emitter circuit of NPN transistor 36 to datum line 32, which will be referred to hereafter as ground. Inductance 34 is an iron core choke which has a value of 400 microhenries measured at 1 kilohertz, has 0.38 ohm D.C. resistance and a Q of 10. Transistor 36 is Delco Electronics type DTS 100 and acts as an on-off switch. Junction 35 is connected through a diode 38 (Delco Service No. 79) to the output line 23 and a storage capacitor 39 of 250 microfarad capacity, 30 volt rating. The other terminal of the capacitor is grounded. With transistor 36 made conducting, current through choke 34 increases toward its limit value. When the transistor is made nonconducting, the energy stored in the choke is delivered as a potential surge through the diode 38 to the storage capacitor 39 and output line 23. The capacitor 39 acts to store energy so that the potential on line 23 is maintained substantially constant. The capacitor minimizes the effect of ripples resulting from the intermittent flow of current through diode 38. Choke 34 saturates at about 10 amperes, but normally switch means 36 opens before this value is reached.

So far as described, the circuit is similar to some previously proposed. We consider that our invention lies in the means by which the circuit is controlled to maintain the desired regulation of the output voltage. This is accomplished through the use of a multivibrator type relaxation oscillator including a first transistor 40 (Delco Service No. 67) and a second transistor 42 (Delco Service No. 513).

A circuit extends from ground line 32 through the emitter-collector circuit of transistor 40, a resistor 43 (1.5 kilohm, 1 watt) and an output voltage feedback line 44 to the output line 23. Transistor 40 is energized off the output line because the input voltage is not sufficient at times for satisfactory operation of the oscillator circuit, and the output voltage is higher. The second transistor 42 is connected in a circuit from junction 35 through the collector-emitter circuit of the transistor and a resistor 46 (1 kilohm) to ground. The base of transistor 42 is connected to the collector of transistor 40 and the emitter of transistor 42 is connected to the base of switching transistor 36.

Junction 35 is also connected through a resistor 47 (10 kilohm) and a capacitor 48 (0.022 microfarad) to a second junction 50. This junction is connected directly to the base of transistor 40 and through a resistor 51 (18 kilohm) to the emitter of transistor 42 and the base of transistor 36, and through resistor 46 to ground.

The output potential feedback line 44 continues through a resistor 52 (1.8 kilohm, one-half watt) to a junction 54. The input line 19 is connected to this junction through a resistor 55 (2.4 kilohm). Junction 54 is grounded through a variable resistor or potentiometer 56 (1 kilohm) and a resistor 58 (1 kilohm) to ground. The resistors 52, 55, 56, and 58 constitute a mixing circuit which provides a potential at junction 54 which is responsive to both the input and output circuit potentials. Since resistor 52 is three-fourths the resistance of resistor 55, the response at terminal 54 is loaded 4 to 3 in favor of the output potential as against the input potential. The level at junction 54 for any given values of these input and output potentials may be adjusted by potentiometer 56 to calibrate or set the normal output potential level. Junction 54 is connected to junction 50 through a Zener diode 60, Delco Service type 149 or equivalent, which has a reverse breakdown voltage of 8 volts.

Considering now the operation of the voltage booster; when the switch 16 is closed and battery voltage is applied to inlet lead 19, current may flow through choke 34 and transistor switch 36, assuming the transistor is conducting or closed, to ground. There is a gradual increase of current and magnetic flux in the choke 34, involving a storage of energy. If the switch 36 is then opened, the field in the choke collapses and a surge of current flows from the choke 34 through rectifier 38 into storage capacitor 39. The emf of the choke is added to the battery potential on line 19 during this part of the cycle. The peak potential at junction 35 is a function of the duration of the current conducting pulses through the choke 34 and switch 36. The average potential on storage capacitor 39 is thus a function of potential on line 19 and the frequency and duration of the pulses, assuming a constant current drain from capacitor 39 to supply the control circuit. The longer the duration of flow through switch 36, the greater the build-up of energy in the coil. Also, the more frequently this cycle repeats, for a given duration, the greater the amount of energy stored and transmitted from the choke 34 in a given time. To put it another way, the voltage build-up caused by the alternate closing and opening of switch 36 is a function of the cycle frequency and also of the duty cycle, which we will define as the fraction of the cycle during which switch 36 is closed. It is also dependent upon the supply voltage, of course.

The cycling of the apparatus is effected by transistors 40 and 42 connected in a multivibrator circuit which controls the transistor switch 36. When transistor 42 is conducting, the potential drop through resistor 46 provides sufficient forward bias in the emitter-base circuit of transistor 36 to cause it to conduct, base current being supplied through transistor 42. When transistor 42 is non-conducting, there is no path for the base current of transistor 36 and it is non-conducting; that is, the switch is open.

Transistor 42 conducts only when transistor 40 is non-conducting, and when transistor 40 is conducting it turns off transistors 42 and 36. Likewise, when transistor 42 conducts, it temporarily turns off transistor 40. This is the multivibrator action previously referred to. The timing is a function of the remainder of the multivibrator circuit and of the feed of input and output potentials into the circuit. Specifically, of capacitor 48 and the alternately charging and discharging currents through resistors 47, 51, and Zener diode 60. When transistor 36 is conducting, the potential between junction 35 and ground is approximately 1½ volts. When transistor 36 is non-conducting, the potential across the circuit is equal to the input (battery) potential plus the instantaneous potential (plus or minus) across choke 34, but limited to a maximum equal to the potential on storage capacitor 39 plus the drop across diode 38 of about 1 volt. In some conditions of operation, capacitor 39 may charge as high as 18 volts, but at normal 12 volt input it runs about 16½ volts.

The potential at junction 35 is applied across the series circuit of resistor 47, capacitor 48, resistor 51, and resistor 46 to ground when switch 36 is open. This charges capacitor 48. When transistor 40 is non-conducting and transistor 42 conducts, there is a circuit through transistor 42 in series with resistors 47 and 51 to discharge capacitor 48. When the capacitor so discharges, the potential at junction 50 rises to the approximately 1 volt level of the base of transistor 36, turning on transistor 40. When transistor 40 is turned on, and transistor 36 becomes non-conducting, the potential at junction 35 rises from approximately 1½ volts to approximately 17 volts, and the potential at junction 50 which is connected to the base of transistor 40 rises also, holding transistor 40 turned on. When transistor 40 turns on, the drop through resistor 43 lowers the base potential of transistor 42 and it is brought to a point near the emitter potential, also reducing the drop through resistor 46 connecting emitter 42 to ground. This turns off transistor 42. With transistor 40 conducting and transistors 42 and 36 thus turned off, capacitor 48 charges through the circuit from connection 35 to ground, through resistors 47, 51, and 46. As the capacitor charges, the potential at junction 50 connected to the base of transistor 40 is gradually lowered. When this potential falls sufficiently to interrupt the emitter to base flow in transistor 40, transistor 40 turns off. This again turns on transistor 42. When transistor 42 is conducting, capacitor 48 discharges through two series circuits, one including resistor 51, transistor 42, and resistor 47, the other including resistors 51 and 46, transistor 36, and resistor 47. As it discharges, the potential at junction 50 again rises. It will be seen, therefore, that there is a multivibrator circuit involving the transistors 40 and 42 and the resistors 43, 46, 47, and 51 and capacitor 48. The operation of this circuit is influenced to some extent by the input and output voltages as above stated, the output voltage being supplied to the collector of transistor 40 and the base of transistor 42, and the input voltage being applied to the collector of transistor 42 and to the RC circuit through resistor 47, capacitor 48, resistor 51, and resistor 46.

The operation of the multivibrator is modified by the effect of the input and output voltages on the potential at junction 50, which is connected to the mixing circuit through the Zener diode 60. As pointed out above, the mixing circuit involving resistors 52, 55, 56, and 58 provides a potential at junction 54, in the absence of any conduction through Zener diode 60, that is determined by the input and output voltages, and is influenced in the ratio of 4 to 3 by the output voltage as against the input voltage.

Under normal conditions, with input voltage 12 and output potential 17, potential at juntion 54 will be about 8 or 9 volts, in the absence of conduction through Zener diode 60. Thus, the mixing circuit provides an input to the multivibrator at junction 50 which is dependent upon input and output voltages and rises as either of these rises. This serves to put both upper and lower limits to the potential at junction 50 and the base of transistor 40. If junction 50 rises more than about one-half volt above mixer output potential at junction 54 there is forward conduction through diode 60 limiting the maximum upswing of potential at junction 50. On the other hand, the potential at junction 50 cannot drop more than 8 volts below that of junction 54 without conduction in the reverse direction through the Zener diode. The circuit thus provides upper and lower limits to the potential on the base of transistor 40 and affects the charging and discharging times of capacitor 48. It thus affects the duty cycle of transistor 40 and therefore the duty cycle of switching transistor 36. Note that the mixing circuit is relatively low resistance as compared to the RC timing circuit of the multivibrator, so potential at junction 54 is not much affected by current flow to or from the RC circuit. Assuming the output potential is constant, which is reasonably near true, the higher the input potential on line 19, the higher the potential will be at junction 54. Therefore, the base of transistor 40 swings to a higher value and the charging time required for capacitor 48 to charge to the cutoff point of transistor 40 is longer. Therefore, the duty cycle of transistor 40 increases with increased input potential and correspondingly the duty cycle of transistor 36 becomes shorter. With the shorter duty cycle, the build-up of energy in the choke per cycle is less and the amount of boost of the supply voltage decreases. When transistor 40 is turned off and junction 35 drops to 1.5 volts as transistor 36 conducts, Zener 60 limits the downswing of potential at junction 50 and provides a second discharge path for capacitor 48 when junction 50 goes 8 volts below junction 54.

It may be of interest to describe briefly the characteristics of an example of this booster as determined experimentally. It was energized from a variable D.C. source and connected through the preferred voltage regulator to a 40 ohm load. As the input voltage was raised from 1 volt, the booster turned on at 1.58 volts; that is, began to oscillate and to boost the voltage, giving a booster output of 6.62 volts. The booster output voltage rises rapidly with increase in input voltage, being 9.33 volts at 2 volts input, 12.57 at 2.5 volts input, and approximately 17 volts at 3 volts input. At this point the gain of the booster starts to cut back, and the output voltage, after rising to 18 volts at 4 volts input, drops off gradually to about 16.6 volts at 12 volts input. At 12.37 volts input the booster turns off; that is, ceases to oscillate or to short the choke, and the output voltage drops to 11.6 volts. Above this point the booster output voltage rises linearly with the input voltage, reaching 14.22 volts at 15 volts input.

The regulator delivered 9.99 volts at 2.43 volts booster input and the voltage remained within one-tenth volt of the desired 10 volts over the rest of the range, the lowest value being 9.90 from the booster at the drop in the booster output to 12.37 volts referred to above. It will be seen, therefore, that the voltage available to the system can drop as low as 2½ volts without interfering with the ability of the booster to provide a sufficiently high voltage to the regulator to provide the desired 10 volts output for the control.

The utility of the voltage booster should be apparent from the foregoing, and its simplicity is evident. The actual device also is quite compact and well adapted for incorporation in electronic engine control systems.

The detailed description of the preferred embodiment of the invention for the purpose of explaining the principles thereof is not to be considered as limiting or restricting the invention, since many modifications may be made by the exercise of skill in the art.

We claim:

1. A voltage booster comprising, in combination, an inductive reactance, a junction point, a rectifier, and a storage capacitor connected in series across an input line; an output line connected across the capacitor; intermittently operable switching means connecting the junction point to the input so as to short circuit the reactance across the input when closed; a multivibrator controlling operation of the switching means, the multivibrator including a timing capacitor charged from the said junction point when the switch means is open and discharged when the switch means is closed; a mixing circuit including a point with a potential responsive to input and output potentials of the booster; and connecting means effective to limit potential swings of the timing capacitor relative to the potential at the said point.

2. A voltage booster comprising, in combination, an inductive reactance, a junction point, a rectifier, and a storage capacitor connected in series across an input line; an output line connected across the capacitor; intermittently operable switching means connecting the junction point to the input so as to short circuit the reactance across the input when closed; a multivibrator controlling operation of the switching means, the multivibrator including a timing capacitor charged from the said junction point when the switch means is open and discharged when the switch means is closed; the multivibrator being in one condition in response to charging of the timing capacitor and in the opposite condition in response to discharge of the timing capacitor; the duty cycle of the switching means being responsive to the relative duration of two said conditions of the multivibrator; a mixing circuit including a point with a potential responsive to input and output potentials of the booster; and connecting means effective to limit potential swings of the timing capacitor relative to the potential at the said point.

3. A circuit for supplying a controlled potential D.C. output from a D.C. source with potential varying over a range including potentials smaller than that of the output, the circuit comprising, in combination, a datum line connecting one side of the source to one side of the output, an inductive reactor and switch means connected in series across the source, a storage capacitor connected across the output, a unidirectional current device connecting a first junction between the reactor and switch means to the storage capacitor and output, and oscillator means effective to open and close the switch means, characterized by oscillator means including mixer means for developing a control potential responsive to both the output and input potentials; a first resistor connected to the output and a first transistor connecting the datum line to the first resistor through the emitter-collector circuit of the transistor; a second resistor connected to the datum line and a second transistor connecting the said junction to the second resistor through the collector-emitter circuit of the second transistor; the base of the second transistor being connected to the collector of the first transistor; potential difference limiting means connecting the mixer means to a second junction connected to the base of the first transistor; a resistor and a feedback capacitor connected in series between the first and second junctions; and a resistor connected between the second junction and the emitter of the second transistor; the second transistor being effective to hold the switch means closed when conducting, the said transistors operating as a relaxation oscillator of variable duty cycle responsive to voltage booster input and output potentials to cycle the switch means between open and closed conditions.

4. A circuit for supplying a substantially constant potential D.C. output from a D.C. source with potential varying over a range from greater than to smaller than that of the output, the circuit comprising a voltage booster and a voltage regulator supplied by the voltage booster, the voltage booster comprising, in combination, a datum line connecting one side of the source to one side of the regulator, an inductive reactor and switch means connected in series across the source, a storage capacitor connected across the output to the regulator, a unidirectional current device connecting a first junction between the reactor and switch means to the storage capacitor and output, and oscillator means effective to open and close the switch means, characterized by oscillator means including mixer means for developing a control potential responsive to both the output and input potentials; a first resistor connected to the output and a first transistor connecting the datum line to the first resistor through the emitter-collector circuit of the transistor; a second resistor connected to the datum line and a second transistor connecting the said junction to the second resistor through the collector-emitter circuit of the second transistor; the base of the second transistor being connected to the collector of the first transistor; a Zener diode connecting the mixer means to a second junction connected to the base of the first transistor; a resistor and a feedback capacitor connected in series between the first and second junctions; and a resistor connected between the second junction and the emitter of the second transistor; the second transistor being effective to hold the switch means closed when conducting, the said transistors operating as a relaxation oscillator of variable duty cycle responsive to voltage booster input and output potentials to cycle the switch means between open and closed conditions.

* * * * *